United States Patent
Henocq et al.

(10) Patent No.: US 8,392,803 B2
(45) Date of Patent: Mar. 5, 2013

(54) METHOD AND DEVICE FOR IDENTIFYING VIDEO DATA LOSSES

(75) Inventors: Xavier Henocq, Melesse (FR); Fabrice Le Leannec, Mouaze (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 12/697,925

(22) Filed: Feb. 1, 2010

(65) Prior Publication Data

US 2010/0205514 A1    Aug. 12, 2010

(30) Foreign Application Priority Data

Feb. 9, 2009   (FR) .................................. 09 50793

(51) Int. Cl.
*H03M 13/00* (2006.01)
(52) U.S. Cl. ....................................... 714/776
(58) Field of Classification Search .................... 714/776
See application file for complete search history.

(56) References Cited

U.S. PATENT DOCUMENTS

| | | | |
|---|---|---|---|
| 7,072,403 B2 | 7/2006 | Kimoto | |
| 7,397,958 B2 | 7/2008 | Le Leannec | |
| 7,426,305 B2 | 9/2008 | Denoual | |
| 7,610,334 B2 | 10/2009 | Henocq | |
| 2005/0114386 A1 | 5/2005 | Nassor | |
| 2005/0198676 A1 | 9/2005 | Henocq | |
| 2006/0268996 A1 | 11/2006 | Sethi | |
| 2007/0033494 A1* | 2/2007 | Wenger et al. ............ | 714/776 |
| 2007/0094579 A1* | 4/2007 | Cerrato Sanchez ........... | 714/776 |
| 2008/0165864 A1 | 7/2008 | Eleftheriadis | |
| 2009/0097483 A1 | 4/2009 | Henocq | |
| 2009/0135818 A1 | 5/2009 | Onno | |
| 2009/0210765 A1 | 8/2009 | Henocq | |

FOREIGN PATENT DOCUMENTS

| | | |
|---|---|---|
| EP | 1 827 023 | 8/2007 |
| WO | 2006/105471 | 5/2006 |
| WO | 2006/134110 | 12/2006 |
| WO | 2008/053029 | 8/2008 |

OTHER PUBLICATIONS

U.S. Appl. No. 12/674,415, filed Feb. 19, 2010.
French Search Report dated Oct. 29, 2009 issued during prosectuion of related French application No. FR 0950793.

* cited by examiner

*Primary Examiner* — Albert Decady
*Assistant Examiner* — Enam Ahmed
(74) *Attorney, Agent, or Firm* — Fitzpatrick, Cella, Harper & Scinto

(57) ABSTRACT

To identify data losses in a video sequence transmitted between a server and at least one client over a communication network, the sequence comprising a plurality of video data containers coded using scalable video coding employing a predetermined number of hierarchical levels, the video data containers being transmitted over the network via a series of data transport packets: a process (311) is carried out of detecting losses and of locating the video data affected by those losses, without decoding the video data, by combining information coming from transport packets and information coming from video data container headers.

Application for improving decoding on receiving a video sequence.

16 Claims, 8 Drawing Sheets

METHOD AND DEVICE FOR IDENTIFYING VIDEO DATA LOSSES

The present invention relates to a method and device for identifying losses of video data.

In the whole of the description, the term "loss" refers in the same way to missing data and to erroneous data.

The invention is situated in the context of the transmission of a video sequence between a server and at least one client over a communication network that is unreliable, that is to say in which the transmission conditions are not stable and/or data losses may occur.

The invention is concerned more particularly with the detection and the location of the video data affected by such losses. The processing operations for detection and location of the video data losses are summarized in the whole of what follows by the expression "identification of the losses".

The case is considered in which the coding of the video sequence is of hierarchical or "scalable" type, that is to say that it employs one or more hierarchical levels, also termed scalability levels or layers. A non-limiting example of such a scalable coding format is the SVC ("Scalable Video Coding") standard.

Three types of scalability have been defined in the SVC standard: spatial, temporal and quality scalability, quality scalability also being known by the name SNR scalability ("Signal to Noise Ratio" scalability).

Temporal scalability enables the temporal resolution of a sequence to be modified (that is to say the number of frames per second represented by the coded data) by deleting certain images, this deletion taking into account the dependencies that may exist between the images.

Spatial scalability consists of inserting several spatial resolutions (corresponding to different numbers of pixels represented by the coded data) in a video stream, the lowest resolution being used for the prediction of the higher resolutions.

Quality scalability takes three forms: coarse grain scalability or CGS, medium grain scalability or MGS and fine grain scalability or FGS. CGS uses the same concepts as spatial scalability, the only difference being that for CGS, the operations of upsampling of the inter-layer prediction are omitted. FGS enables a bitstream to be created which may be truncated at any point while remaining decodable. MGS has been defined as intermediate between CGS and FGS: it provides decoding points in the bitstream that are finer than CGS but does not enable truncation at any point like FGS. MOS is often considered as providing sufficient granularity for realistic network conditions.

The transmission of a video over a network is facilitated by the introduction of the concept of NAL ("Network Abstraction Layer") unit. A NAL is an elementary unit for transfer of the bitstream which, in its header, provides description information on the data transported in the data part of the NAL.

By way of non-limiting example, for the transmission of an SVC stream, the NAL may be seen as a video data container; the NAL header comprising in particular the following parameters:
  Dependency_id (DId): specifies the spatial layer of the video data contained in the NAL;
  Quality_id (QId): specifies the quality layer of the video data contained in the NAL;
  Temporal_id (TId): specifies the temporal layer of the video data contained in the NAL.

All the NALs corresponding to the same coded image form an entity termed AU ("Access Unit").

The sequence number is chosen at random for the first packet of a video transmission session. It then increments by 1 each time a new packet is created for that application.

The timestamp represents the time at which the transported data were created. For example, all the SVC data corresponding to the same time must bear the same timestamp if they are transported by several packets.

It is particularly desirable to have available a technique enabling precise identification of the data of a video sequence that have been lost in transmission.

In a first example, at the client side, it is particularly advantageous to be able to precisely identify the images affected by a loss before starting the decoding process. This is because it will then be possible to avoid decoding an SVC layer of an SVC bitstream if it is known that the overall quality of that layer is strongly degraded.

In a second example, the early identification of the images affected by losses may enable a decision to be taken as to the type error resilience method to apply. As a matter of fact, numerous error resilience techniques are available when an error occurs: re-transmission of the lost data, Intra refresh, error concealment, error correcting codes (FEC i.e. "Frame Error Correction"), etc.

The efficacy of some of these techniques is closely dependent on the reaction time of the client. For example, the re-transmission of the lost data is often considered as a slow process which is not adapted to video transmission applications.

In a second example, it is possible to have the case of a network constituted by so-called intelligent network nodes, of MANE ("Media Aware Network Element") type, capable of analyzing the NAL header but unable to decode the video data. Such a network transports scalable video data, each scalability layer being transported in a dedicated multicast session. The users of this application may subscribe to a subset of the scalability layers depending on their capacities. In such a case, it is particularly advantageous to be able to evaluate to what extent a layer has been affected by losses, in order to avoid routing layers to a client which will not provide a sufficient improvement in the spatial, SNR or temporal quality.

In the context of a video transmission application (often termed "video streaming") between a server system and a client over a network, the video data are often transported in RTP ("Real-time Transport Protocol") packets, since RTP provides an advantageous set of error resilience tools.

The RTP packet header contains in particular two items of information:
  a sequence number, and
  a timestamp (denoted Timestamp).

The sequence number provides a way to detect that a loss has occurred in a set of packets. To be precise RTP prevents sequence number skipping. If a client detects a skip greater than 1 in the sequence numbers between two consecutively received packets, it can deduce thereby that at least one loss has occurred.

However, the detection of losses by the network layer by means of only the sequence number does not enable the images to be identified that have been affected by those losses, nor to determine the impact of those losses on the overall quality.

Document U.S. Pat. No. 7,072,403 proposes a cooperation between the network layer and the decoder, in a system in which the packets transport data blocks corresponding to a set of pixels. The receiver detects errors in the packets at network level using error detecting codes and provides the corresponding information to the decoder. The decoder decides whether the blocks contained in the packets are actually affected by a loss. If that is the case, error concealment is applied.

This method has a major drawback: without the aid of the decoder, the network layer is incapable of identifying the blocks of pixels which have been affected by the losses.

The SVC standard provides certain tools for detecting data losses, by imposing constraints on the values taken by the above-defined parameters DId, QId and TId contained in the NAL headers, and by introducing a particular NAL: the SEI ("Supplemental Enhancement Information") scalable message, which transports information describing the SVC sequence.

The flowchart of FIG. 1 illustrates the principle of the process of loss detection available in the SVC standard.

This process commences at a test 101 by the analysis of the value, denoted Tid of the parameter TId contained in the SVC NAL header. The notation Tid represents the value of the parameter TId of the last received packet and the notation Tid_ represents the value of the parameter TId of the packet received immediately prior to the last received packet. If the TId parameters of these two packets have the same value, the test 101 is followed by a test 103.

The test 103 consists of analyzing the value of the parameter DId. The notation Did represents the value of the parameter DId of the last received packet and the notation Did_ represents the value of the parameter DId of the packet received immediately prior to the last received packet. If the DId parameters of these two packets have the same value, the test 103 is followed by a test 105.

The test 105 consists of analyzing the value of the parameter QId. The notation Qid represents the value of the parameter QId of the last received packet and the notation Qid_ represents the value of the parameter QId of the packet received immediately prior to the last received packet.

If the QId parameters of these two packets have the same value, certain information may be deduced as to the event 121 corresponding to the reception of the last packet: there is a strong probability that no loss occurred and that the last packet received corresponds to the new slice of the same AU in the same scalability layer as the preceding packet.

However, event 121 may also correspond to an error which cannot be detected solely by means of the tools constituted by the parameters TId, QId, DId, and the SEI message. Thus, if an image is constituted by several slices, the loss of certain slices cannot be detected.

If at test 105, the two consecutive packets do not have the same value of QId, it is checked at a test 107 whether Qid=Qid_+1. If that is the case, it can be deduced thereby that there is a strong probability that no loss has occurred and that the last packet received transports the following quality layer of the same AU (event 123).

However, here too, there is an uncertainty since event 123 may correspond to a change in AU which may hide a data loss.

At test 107, if Qid is different from Qid_+1, it can be deduced thereby that a loss has occurred.

However, it is not possible to determine whether several NALs have been lost (event 109).

At test 103, if Did is different from Did_, it is checked at a test 147 whether Did=Did_+1. If this is not the case, it may be deduced thereby that a loss has occurred (event 149).

However, here too, it is impossible to determine the number of lost NALs.

If at test 147, Did=Did_+1, it is checked at a test 151 whether Qid=0. If that is not the case, it may be deduced thereby that a loss has occurred (event 153), but it cannot be deduced thereby how many NALs have been lost. If Qid=0, there is a strong probability that a new spatial layer has been received of the same AU as the preceding packet (event 155). However, event 155 may also correspond to the reception of a new AU, which may conceal a loss.

If at test 101, the two consecutive packets do not have the same value of TId, it is checked at a test 111 whether Tid=Tid_+1. If the difference between these two values of TId is greater than 1 (test 111 negative), it may be deduced thereby that a loss has occurred (event 125), without however knowing precisely how many NALs have been lost.

If Tid=Tid_+1, it is checked at a test 113 whether Did<Did_. If that is the case, Did_ and Qid_ should have their maximum value (these values are respectively denoted Max-Did and MaxQid in the drawing), given by the SEI message (test 127). If test 127 is negative, it may be deduced thereby that a loss has occurred, without however knowing precisely how many NALs have been lost (event 129): some NALs (corresponding to quality or spatial scalability layers, respectively denoted Q and D in the drawing) may be missing from the end of the last AU and some NALs may be missing from the start of the current AU.

If test 127 is positive, it is then checked at a test 131 whether DId has its minimum value for the value of TId considered (denoted minDid(Tid) in the drawing). The minimum value of DId for a given value of TId is deduced from the SEI message. If test 131 is positive, there is a strong probability that no loss has occurred and that a NAL has been received corresponding to a new AU (event 133).

However, event 133 may also correspond to a change of AU which may conceal a loss.

If test 131 is negative, it may be deduced thereby that a loss has occurred (event 135), without however knowing how many NALs (corresponding to spatial scalability layers) have been affected.

If test 113 is negative (that is to say Did≧Did_), it is checked at a test 115 whether Did=Did_. If this is not the case (that is to say that Did>Did_), it may be deduced thereby that some NALs (corresponding to spatial scalability layers) have been lost, without however knowing the number thereof (event 137).

If test 115 is positive, it is checked at a test 117 whether Qid<Qid_. If that is the case, Qid_ should have its maximum value (test 141). If test 141 is negative, it may be deduced thereby that a loss has occurred, without however knowing the number of NALs affected (event 139).

If test 141 is positive, there is a strong probability that a new AU has been received (event 145). However, event 145 may also signify that a loss has occurred and that this loss has been concealed by a change of AU.

If test 117 is negative (that is to say if Qid≧Qid_), Qid and Qid_ should have the value 0 (test 119). If that is the case, it can be deduced thereby that there is a strong probability that no loss has occurred and that the last packet received contains a new AU (event 143). However, here too, if an illegal change of AU has occurred, this error cannot be identified.

If test 119 is negative, it may be deduced thereby that a loss has occurred (event 120), but here again, without knowing precisely how many NALs (corresponding to quality scalability layers) have been affected.

Thus, the tools provided by the SVC standard do not, alone, enable it to be determined precisely whether a loss has occurred (events 121, 123, 143, 145, 133, 155 in FIG. 1) and, when a loss has actually occurred, they do not enable it to be precisely determined how many NALs are affected, nor, a fortiori, what image is affected by that loss.

Moreover, the usual mechanisms for detecting and locating errors sometimes use information contained in the slices, such as the image number (FrameNum) and/or the POC ("Picture Order Count") parameter, present in the decoded image and relating in particular to the order of the images.

However, this information is not available at network level and these mechanisms require the slices to be at least partially decoded by the decoder.

Furthermore, the H.264 and SVC standards specify various ways of coding the POC parameter referred to above, in the slice header. One way consists of coding the POC parameter using predictive encoding. However, when a loss of video data occurs in a NAL having a POC so coded predictively, it becomes impossible to retrieve the POC from the following images. The known techniques for detecting and locating video data losses based on the parameters TId, DId, QId, FrameNum and POC are not then operative.

The present invention aims to mitigate the drawbacks of the prior art.

To that end, the present invention provides a method of identifying data losses in a video sequence transmitted between a server and at least one client over a communication network, the video sequence comprising a plurality of video data containers, these video data being coded using hierarchical video coding employing a predetermined number of hierarchical levels, the video data containers being transmitted over the network via a series of data transport packets, this method of identifying data losses comprising a step of detecting and locating errors, consisting of detecting data losses and of locating the video data affected by said losses, the step of detecting and locating errors requiring no decoding of video data contained in the video data containers and consisting of:
  combining information coming from transport packets and information coming from video data container headers and
  deducing therefrom the detection of the data losses and the location of the video data affected by those losses.

Thus, the invention enables early detection and location, at network level, of the data losses (that is to say missing or erroneous data), without requiring information from the decoder. It makes it possible to determine not only the images which have been affected by losses, but also the influence of those losses on the quality of the video sequence, this being without decoding the images. In particular, by virtue of the present invention, it is not necessary to decode the slices.

These early decisions on the losses may be used for an early request for re-transmission of the lost data. The lost data, that is to say the missing or erroneous data, may thus be re-transmitted sooner.

Furthermore, the location of the errors may be precisely determined. All the tosses may be detected and located, with no uncertainty.

Furthermore, this makes it possible, at network level, to choose with efficacy the error resilience methods and to select with efficacy the decoded layers.

In a particular embodiment, in which the video sequence further comprises at least one container of descriptive information, this information describing the video sequence, the method of identifying data losses further comprises a step of receiving the descriptive information container and a step of creating a representation of a group of pictures of the video sequence.

The representation so created contributes to enabling the data losses to be located.

In a particular embodiment, the step of receiving the descriptive information container comprises:
  an extraction operation consisting of extracting information from the descriptive information container, this extraction operation being carried out once and only once, the aforementioned creating step using the information from the descriptive information container.

By way of example that is in no way limiting, the descriptive information container may be a specific NAL. This descriptive information is easily detectable by a depacketizer, since it is well localized in a specific part of the video sequence, in this case, the descriptive information container.

The analysis of the descriptive information requires no complex decoding, a mere reading operation suffices. This analysis may be performed outside the video decoder (SVC decoder, for example) that implements operations that are the reverse of those carried out during the hierarchical video coding. A separate entity, dedicated to this analysis may be provided.

According to a particular feature, the detection of data losses consists of using information relative to the rank of the data transport packets in the series of data transport packets.

The fact of basing the detection of the losses on simple parameters such as the rank of the transport packets makes it possible to avoid implementing a complex procedure at the decoder. Furthermore, if no loss is detected, the loss locating procedure is not implemented.

In a particular embodiment in which the data loss identification method in accordance with the present invention employs a transport protocol of RTP ("Realtime Transport Protocol") type, according to a particular feature, the transport packets are RTP packets and the information concerning the rank of the transport packets in the series of transport packets are the RTP sequence numbers of the transport packets.

The RTP protocol is particularly well-adapted to the method of detecting losses and enables it to be facilitated.

In a particular embodiment, the video sequence is coded in accordance with the SVC ("Scalable Video Coding") standard.

Thanks to a specific NAL header provided in the SVC standard, this standard is particularly well-adapted to the location of the losses and enables this location to be facilitated.

With the same aim as that indicated above, the present invention also provides a client device in a communication network, comprising a computing unit, a storage unit and a unit for communicating with the network, the computing unit cooperating with the storage unit and the unit for communicating with the network. The computing unit is adapted to identify data losses in a video sequence received from a server device,
  the video sequence comprising a plurality of video data containers, the video data being coded using hierarchical video coding employing a predetermined number of hierarchical levels, the video data containers being received by the client device from the server device, over the network, via a series of data transport packets,
  the computing unit comprising a unit for detecting and locating errors, adapted to detect data losses and to locate the video data affected by those losses,
  the unit for detecting and locating errors operating without requiring video data contained in the video data containers to be decoded and comprising:
    a module for combining information coming from transport packets and information coming from video data container headers and
    a module for deducing therefrom the detection of the data losses and the location of the video data affected by those losses.

Still with the same aim, the present invention also provides, as an application of the method of identifying data losses succinctly described above, a method of receiving a video sequence transmitted between a server and at least one client over a communication network, the video sequence comprising a plurality of video data containers, these video data being coded using hierarchical video coding employing a predetermined number of hierarchical levels, the video data containers being transmitted over the network via a series of data transport packets, this receiving method comprising:

a step of detecting and locating errors, consisting of detecting data losses and of locating the video data affected by those losses, the step of detecting and locating errors requiring no decoding of video data contained in the video data containers and consisting of:

combining information coming from transport packets and information coming from video data container headers and deducing therefrom the detection of the data losses and the location of the video data affected by those losses; and a selecting step, consisting of selecting, according to the location of the video data affected by the losses, at least one hierarchical level of video data not to decode.

The decoding is thus improved, by taking into account the fact that the different levels which result from the hierarchical video coding are of variable importance.

In a particular embodiment of the receiving method, the selecting step comprises:

a first test, consisting of determining whether a video data container which corresponds to an image belonging to a given hierarchical level is lost; and a marking operation, consisting of marking the image as being lost if, at the first aforementioned test, a container corresponding to that image is determined as being lost.

In a particular embodiment of the receiving method, the selecting step further comprises:

a second test, consisting of determining whether a reference image for an image belonging to a given hierarchical level is lost; and a marking operation, consisting of marking the image as being lost if, at the second aforementioned test, a reference image for that image is determined as being lost.

In a particular embodiment of the receiving method, at the selecting step, a hierarchical level is selected according to the number of images belonging to that hierarchical level which have been marked as being lost.

According to a particular feature, this number is compared to a threshold which depends on the aforementioned hierarchical level.

This enables differentiated processing to be performed of the hierarchical levels, by giving them a variable importance.

In a particular embodiment of the receiving method, when, at the selecting step, a hierarchical level is selected, selection is also made of one or more hierarchical levels higher than the selected level.

The features of the receiving method stated previously enabling the decoding to be accelerated, given that it is avoided to decode levels which are higher than a level which has undergone losses, that is to say that there is no need to go through the entirety of the representation of the video sequence received.

In a particular embodiment of the receiving method, the steps of detecting and locating and of selecting are carried out by hierarchical level, starting with the lowest hierarchical level.

This makes it possible to maintain the stability of the decoding quality without having to go through the entire representation of the video sequence received.

Still with the same aim, the present invention also provides a client device as succinctly described above, in which the computing unit further comprises a module for selecting, according to the location of the video data affected by the losses, at least one hierarchical level of video data not to code.

Still with the same aim, the present invention also concerns an information storage means which can be read by a computer or a microprocessor storing instructions of a computer program, for implementing a method of identifying data losses and/or a receiving method as succinctly described above.

Still with the same aim, the present invention also concerns a computer program product able to be loaded into a programmable apparatus, comprising sequences of instructions for implementing a method of identifying data losses and/or a receiving method as succinctly described above, when that program is loaded and executed by the programmable apparatus.

The particular features and the advantages of the client device, of the information storage means and of the computer program product are similar to those of the methods succinctly described above. These aspects and advantages are thus not repeated here.

Other aspects and advantages of the invention will appear from reading the following detailed description of particular embodiments, given by way of non-limiting example. The description refers to the accompanying drawings, in which:

FIG. 1, described earlier, is a flowchart illustrating the principle of the process of detecting data losses that is available in the SVC standard;

Figure 3:
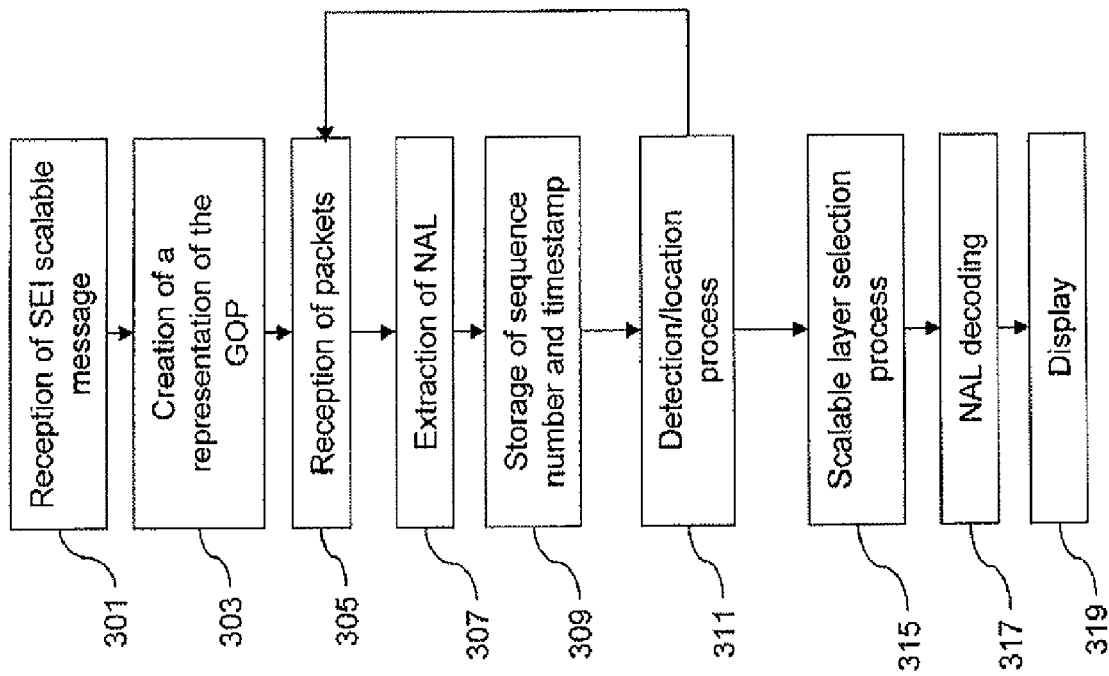
FIG. 3 is a flowchart illustrating the main processing phases carried out on the client side in accordance with the present invention, in a particular embodiment.
Figure 6:
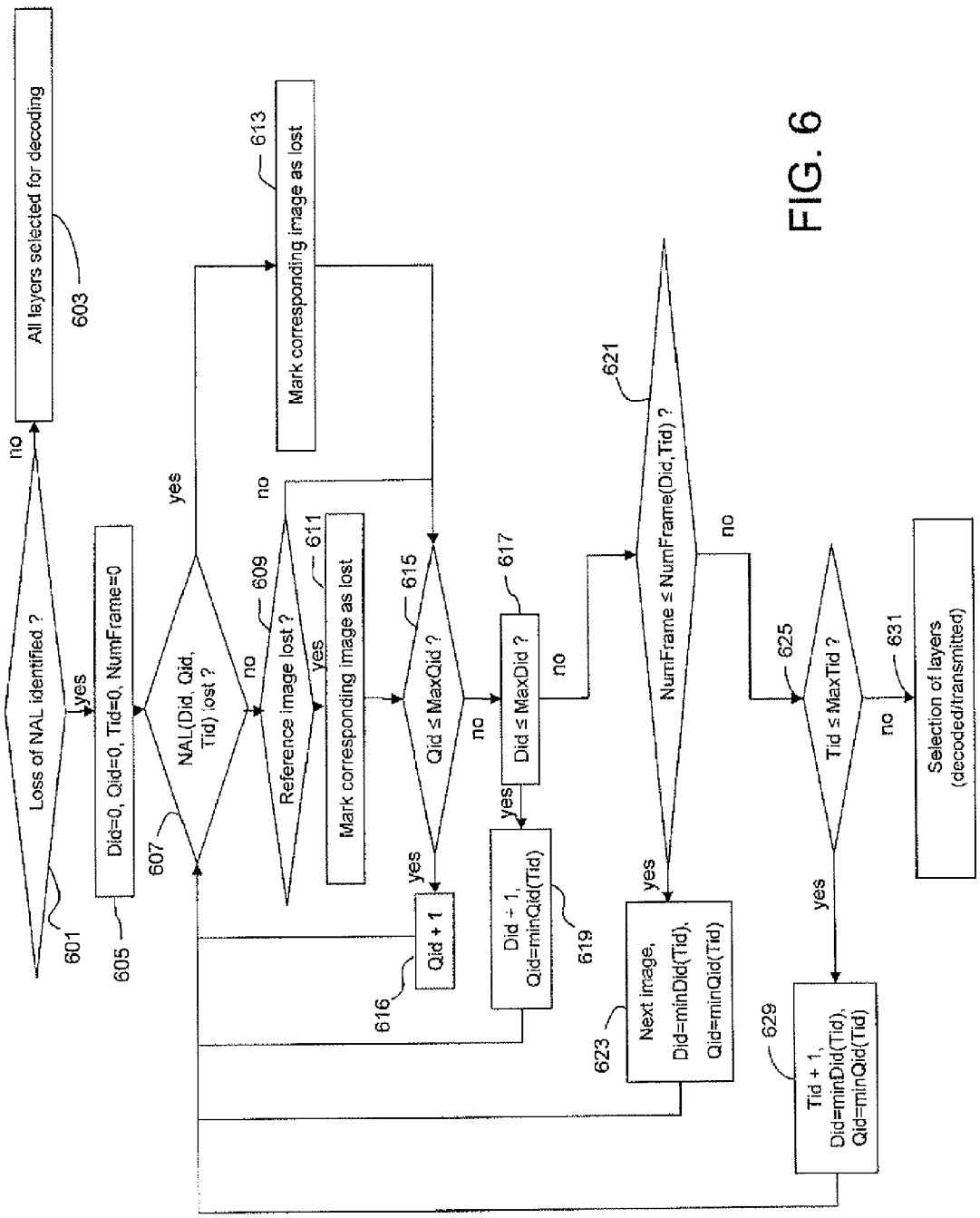
Figure 7:
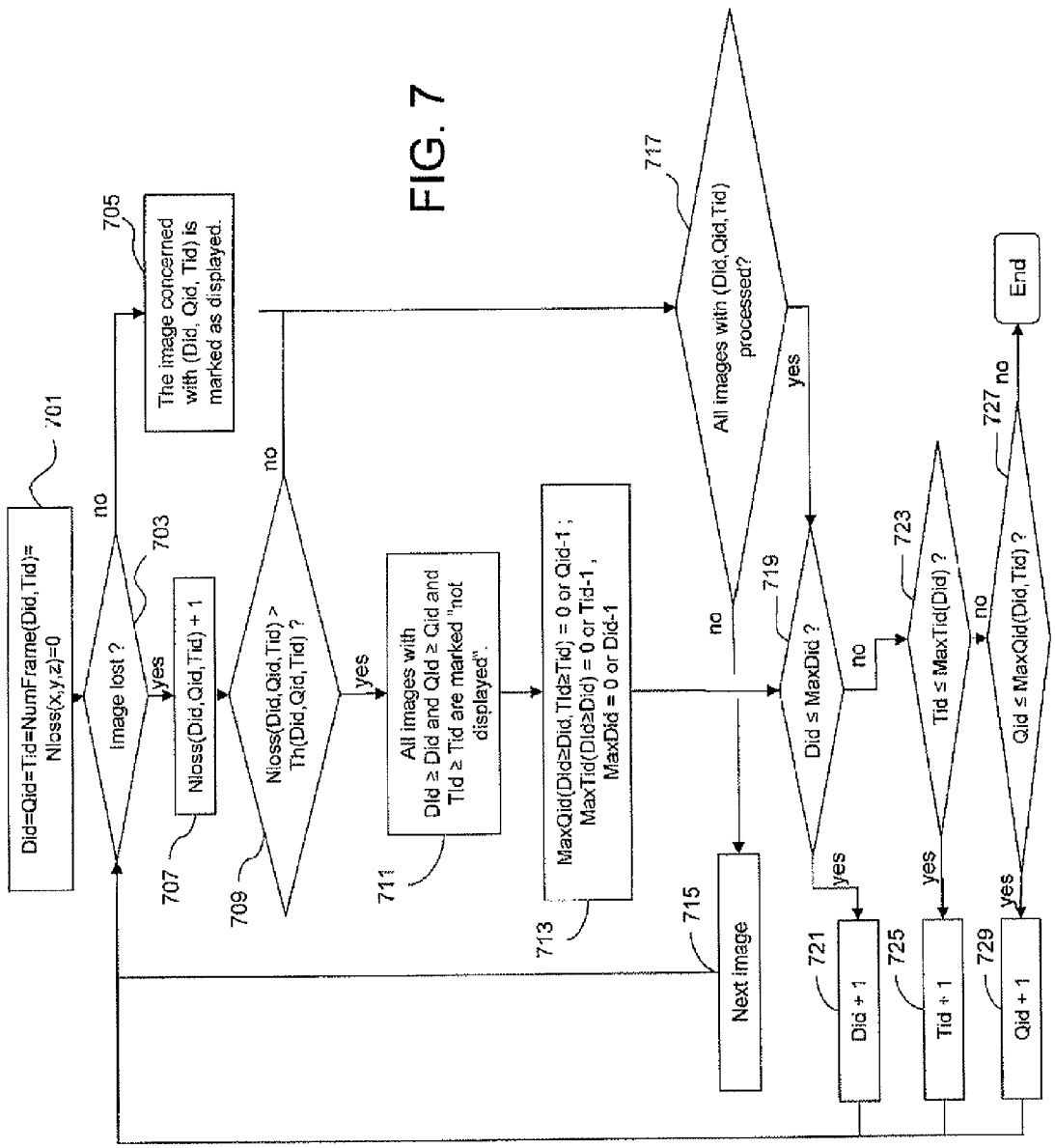

FIG. 6 is a flowchart illustrating the phase of analysis of the scalable layers, prior to selecting the layers to decode, included in the phase of selecting the scalable layers illustrated in FIG. 3, in a particular embodiment; and FIG. 7 is a flowchart illustrating the actual selecting phase of the layers to decode, included in the phase of selecting the scalable layers illustrated in FIG. 3, in a particular embodiment.

In all that follows, a video sequence is considered that is transmitted between a server and one or more client(s), over a communication network.

In accordance with the present invention, it is sought to identify the video data losses in that sequence, that is to say to detect missing or erroneous video data and to locate them.

An example of a particular embodiment is described in which the video data are coded in accordance with a video coding standard with data compression such as H.264 or SVC, involving the concept of NAL unit mentioned in the introductory part of the present description.

In this example, which is in no way limiting, it is sought to determine which NALs are lost (missing or erroneous).

This processing takes place on the client side, in the client/server architecture sense.

The invention is described in a particular application consisting of selecting the scalable layers which will be provided to the decoder to be decoded and displayed with a constraint consisting of providing a constant quality to the client.

Figure 1:
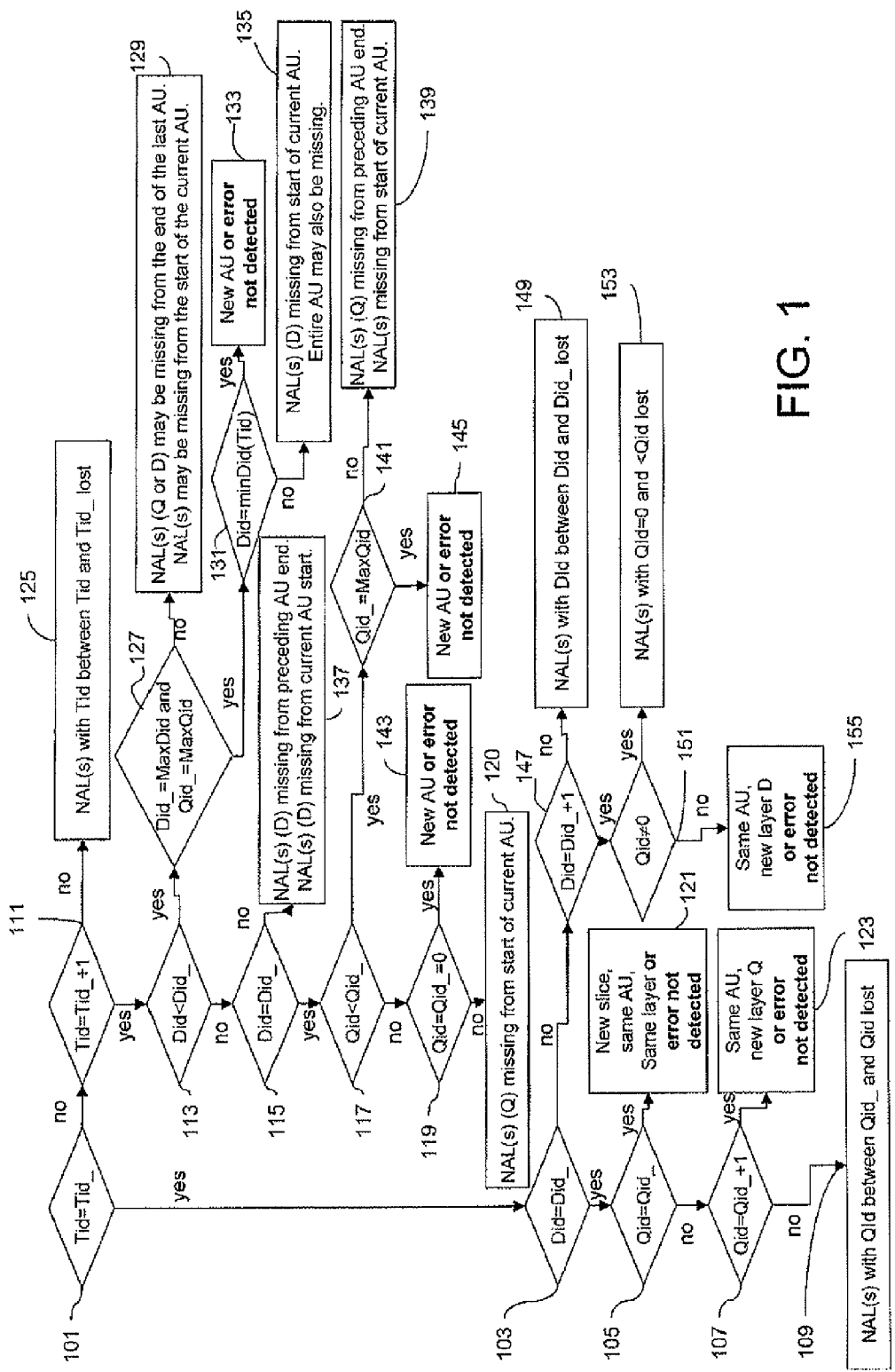
Figure 2A:
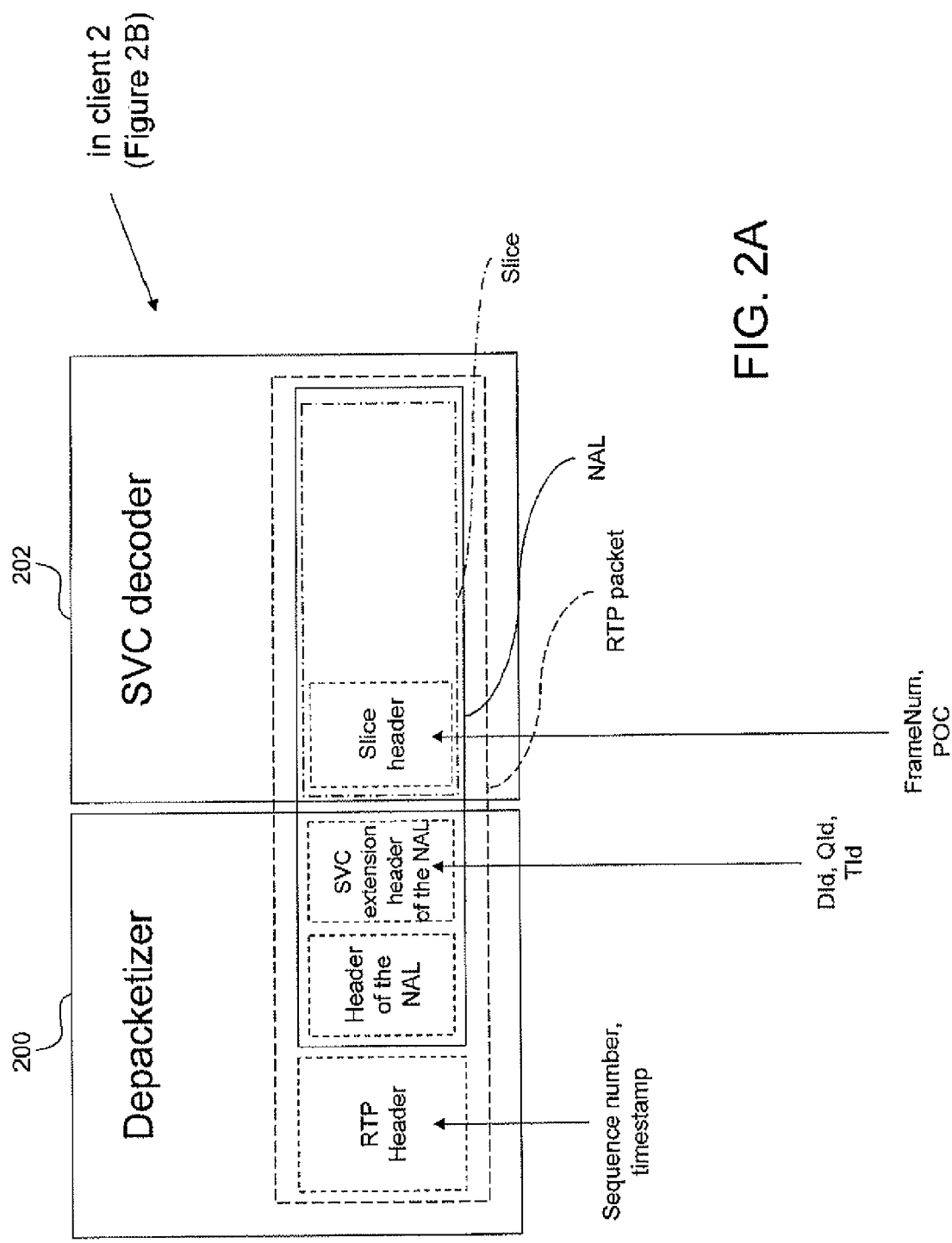
FIG. 2A is a diagram, in a particular embodiment, of the items of information used by the method in accordance with the present invention, as well as the modules respectively having the task of the analysis of those items of information, in a client in the client/server architecture sense, in a communication network.
Figure 2B:
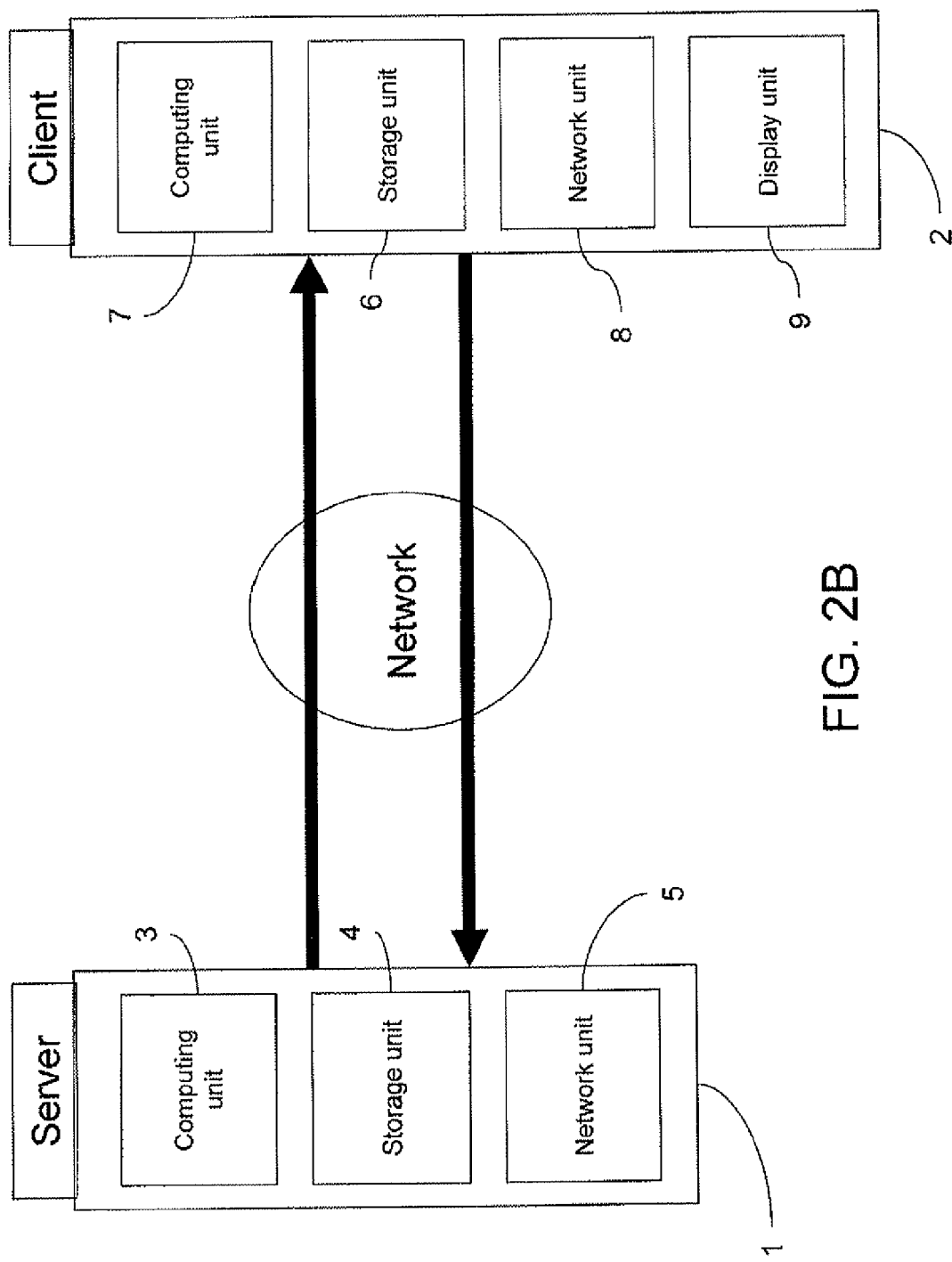
FIG. 2B is a diagram of a particular embodiment of a video transmission system adapted to implement the present invention.

As shown in FIG. 2B, a video transmission system adapted to implement the present invention comprises a server 1 and a client 2.

The server 1 comprises a storage unit 4 which stores a coded video. The server 1 further comprises a computing unit 3 adapted to execute programs, as well as a network unit 5 adapted to send video data over the network.

A unit for acquiring video data (not shown), such as a video camera, may be added for live video capture, the computing unit 3 having the task of compressing the video.

The client 2 comprises a storage unit 6 which stores programs of the client in memory and a computing unit 7 adapted to execute programs. The storage unit 6 of the client includes in particular one or more programs which comprise sequences of instructions for implementing a method of identifying data losses in accordance with the present invention, on loading into the client 2 of that program or those programs and execution thereof by the computing unit 7 of the client.

The client 2 also comprises a network unit 8 adapted to receive data packets, as well as a display unit 9.

As FIG. 2A, shows, in a particular embodiment, the method in accordance with the invention is implemented by the client 2 in software form, mainly, on the one hand, in a depacketizer module 200 and on the other hand, in an SVC decoding module 202 (called "SVC decoder" in the drawing) in this case, which is in no way limiting, in which the video data are coded in accordance with the SVC standard.

FIG. 2A represents an RTP packet (in the non-limiting example in which the data are transported over the network using the RTP protocol) transporting an SVC slice. The drawing also shows the location, in the RTP packet, of the data used, by the method in accordance with the invention, for the detection and the location of the data losses, i.e.

Sequence number of the RTP packet and timestamp of the RTP packet: in the RTP header;

Parameters DId, QId, and TId: in the so-called SVC NAL extension header;

The information contained in the RTP header and the information contained in the NAL header are managed by the depacketizer module 200.

The information contained in the slice header are managed by the SVC decoding module 202.

It is to be noted that the FrameNum and POC parameters (situated in the slice header) are not used by the method in accordance with the invention. They have however been represented in order to show that their determination would require decoding by the SVC decoder. The present invention, precisely, enables such decoding to be dispensed with.

In accordance with the invention, a particular NAL is decoded uniquely, once and only once, at the start of the video sequence: the scalable SEI message (or "scalable Supplemental Enhancement information message") (see step 301 on the flowchart of FIG. 3 described below). As mentioned in the introductory part of the description, the SEI scalable message transports information describing the SVC sequence.

This particular decoding process may be carried out by a dedicated module, external to the SVC decoder.

The main processing operations carried out on the client side are summarized on the flowchart of FIG. 3. In what follows, these processing operations are described in more detail, in connection with FIG. 3 and with reference to FIGS. 2A and 2B described previously.

As stated above, a video session commences with step 301 by the reception of an SEI scalable message. This message is parsed and all the data necessary to the creation of a representation of a group of pictures or GOP are extracted during step 301. Such a representation of the GOP is created at a step 303 and is stored in memory in the storage unit 6 of the client.

Next the following packets are received (step 305). In the particular embodiment described here, the client receives the SVC video stream in the form of RTP packets. A loop is then carried out, comprising step 305 as well as steps 307, 309 and 311, as follows.

At step 307, the depacketizer 200 extracts the NALs from the RTP packets. On extraction of the NALs during this step 307, the depacketizer 200 also extracts the RTP packet sequence number as well as the timestamp.

Next at a step 309, the depacketizer 200 stores these items of information in a buffer memory in the storage unit 6 of the client. The RTP packet sequence number and the timestamp remain stored there until the corresponding NAL has been decoded by the SVC decoder 202 and/or deleted from the client storage unit 6 by the depacketizer 200.

The processing operations of detecting/locating in accordance with the present invention then commence. These processing operations are illustrated in summarized form by block 311 ("detecting/locating process") on FIG. 3 and are carried out in the depacketizer 200. They will be described in more detail below.

Next, at the following step 315, a scalable layer selecting process is implemented.

At the following step 317, the SVC decoder 202 accesses the NALs processed previously as described above and conducts the SVC decoding process of those NALs, if that decoding is however possible, according to any errors detected and located previously in the data.

At the following step 319, the images resulting from this SVC decoding are displayed.

It is to be noted that, in parallel to conducting steps 315, 317 and 319 which have just been described, steps 305, 307, 309 and 311 (that is to say respectively the reception of the packets, the NAL extraction, the packet sequence number storage and the timestamp storage, as well as the error detecting/locating process) are carried out for the following packets for as long as packets continue to be received.

Figure 4:
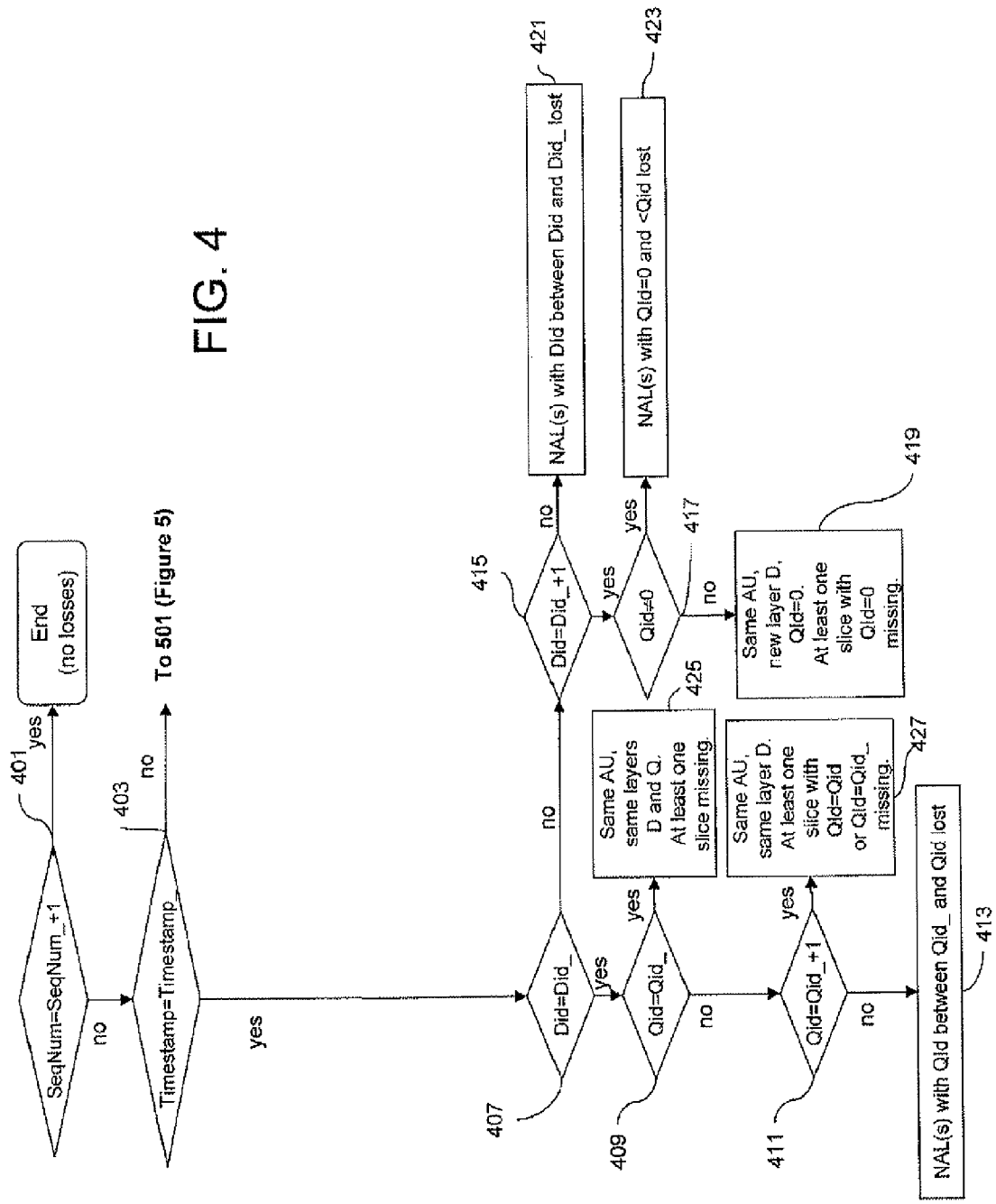
FIGS. 4 and 5 are flowcharts illustrating in more detail, in a particular embodiment, the identification phase illustrated in FIG. 3.

As FIG. 4 shows, in accordance with the present invention, the detecting/locating process of step 311 of FIG. 3 commences at a test 401 which consists of comparing the sequence number, denoted SeqNum, of the last received packet, and the sequence number, denoted SeqNum_, of the packet received immediately before the last received packet. If the difference between these two sequence numbers is 1 (test 401 positive), it can be deduced thereby that no loss has occurred. In this case, the detecting/locating process terminates.

Otherwise (test 401 negative), it is already known at this stage that at least one packet has been lost, without however knowing which NAL has been affected.

In this case, a test 403 is carried out, consisting of comparing the timestamp, denoted Timestamp, of the last received packet, and the timestamp, denoted Timestamp_, of the packet received immediately prior to the last received packet.

If these two consecutive packets do not have the same timestamp value (test 403 negative), step 501 is proceeded to, described later in connection with FIG. 5.

On the other hand, if the two consecutive packets have the same timestamp (test 403 positive), Did and Did_ are compared at the following test 407.

If Did=Did_, it is tested whether Qid=Qid_ at the following test 409. If test 409 is positive (Qid=Qid_), this means that at least one slice is missing from the same AU, in the same spatial layer and in the same quality layer as those of the last received NAL (event 425).

If the test 409 is negative, it is tested whether Qid=Qid_+1 at test 411. If test 411 is positive (Qid=Qid_+1), it may be deduced thereby that at least one slice is missing from the same AU and from the same spatial layer and with a quality layer equal to Qid or Qid_ (event 427).

If test 411 is negative (Qid is not equal to Qid_+1), it may be deduced thereby that the NALs for which QId is between Qid_ and Qid have been lost (event 413).

If the two consecutive packets have different values of Did (test 407 negative), it is tested at a test 415 whether Did=Did_+1. If this is not the case (test 415 negative), it may be deduced thereby that the NALs for which Did is between Did and Did_ have been lost (event 421).

Otherwise, that is to say if Did=Did_+1 (test 415 positive), it is tested whether Qid=0 (test 417). If Qid is not zero (test 417 positive), this means that the NALs with QId=0 and QId<Qid have been lost (event 423). Otherwise (that is to say if Qid=0, i.e. test 417 negative), it may be deduced thereby that the same AU is being considered, in a new spatial layer and with QId=0. It is thus deduced therefrom that at least one slice is missing with QId=0 (event 419).

Figure 5:
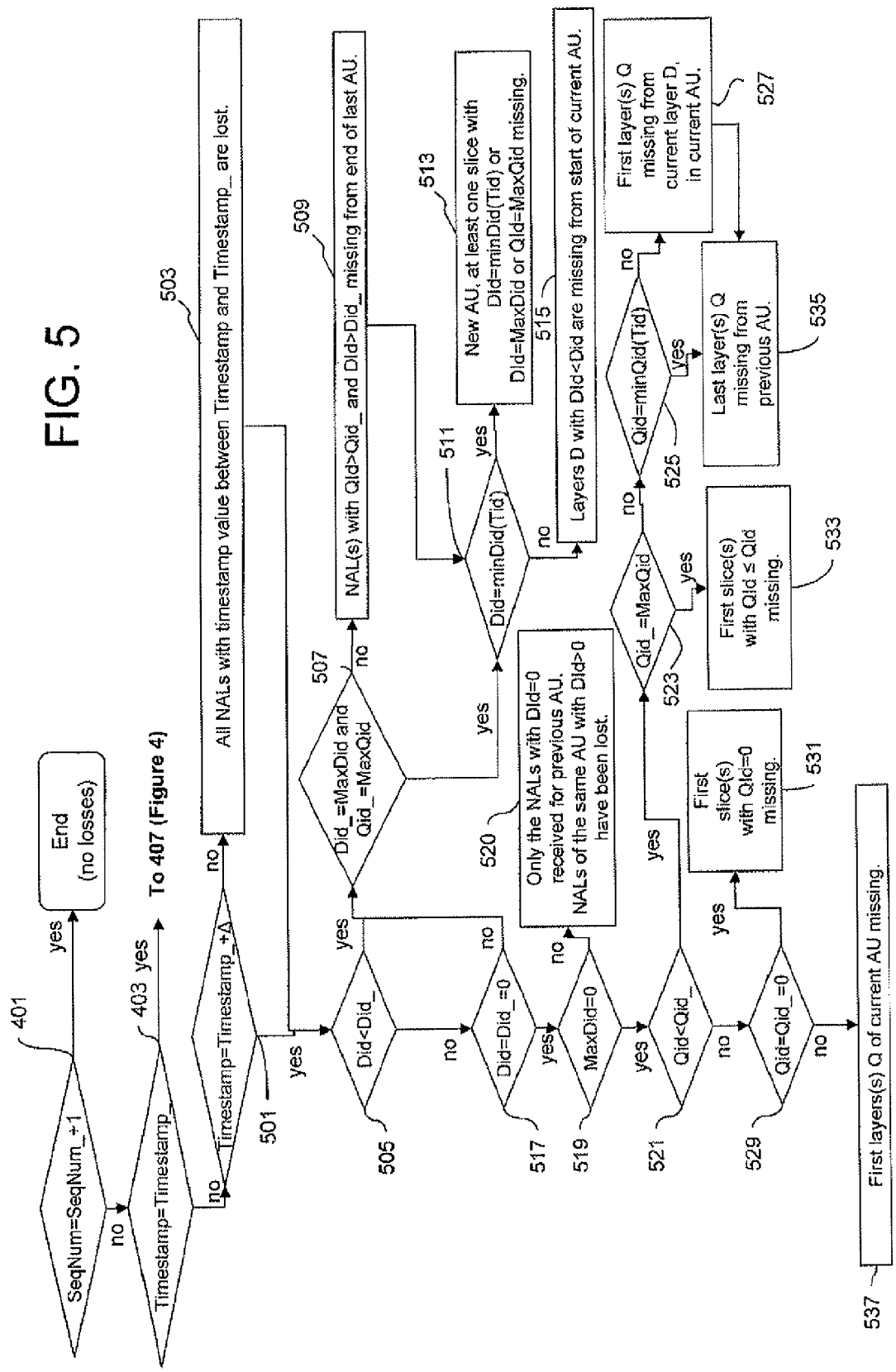

As represented in FIG. 5, the additional part of the detecting/locating process in accordance with the present invention commences when the two consecutive packets do not have the same timestamp value (test 403 negative).

A test 501 is then performed to determine whether the difference between the two timestamp values (denoted Timestamp and Timestamp_) is equal to an authorized time unit, denoted Δ.

If that is not the case (test 501 negative), it may be considered that all the NALs for which the timestamp values are between Timestamp_ and Timestamp, which should thus have been received between Timestamp_ and Timestamp, have been lost (event 503).

The authorized time unit Δ may be deduced from Timestamp_, on the basis of the representation of the GOP created at step 303 (FIG. 3) and by following the rules regarding the decoding order of the SVC NALs as defined in the SVC standard.

Thus, for example, one NAL will be decoded before any NAL which depends therefrom. Furthermore, any NAL corresponding to an AU unit will be decoded before any other NAL of another AU—the AU unit representing, as stated in the introductory part of the description, all the NALs correspond to the same coded image.

Test 501 and step 503 are followed by test 505, which consists of determining whether Did<Did_.

If Did<Did_ (test 505 positive), it is determined at a test 507 whether Did_ and Qid_ have their maximum value, that is to say it is tested whether Did_=MaxDid and Qid_=MaxQid. If this is not the case (test 507 negative), this means that NALs with QId>Qid_ and DId>Did_ at the end of the last AU (event 509) are missing.

Test 507 and event 509 are followed by a test 511 which consists of determining whether Did has its minimum value for the current value of Tid, that is to say if Did=minDid(Tid).

If that is the case (test 511 positive), it may be deduced thereby (event 513) that a new AU has been received and that at least one slice is missing, either with DId=minDid(Tid) in the current AU, or with DId=MaxDid or QId=MaxQid in the previously received AU.

If test 511 is negative, that is to say if Did is different from minDid(Tid), it may be deduced thereby that spatial layers are missing with DId<Did at the start of the current AU (event 515).

If test 517 is positive, that is to say if Did=Did_=0, it is determined at a test 519 whether the maximum value of DId is zero (i.e. MaxDid=0). If that is the case, test 521 described below is proceeded to. Otherwise, this means that only the NALs corresponding to DId=0 have been received for the preceding AU, and that the NALs of that AU having higher DId values have been lost (event 520).

Test 521 consists of checking whether Qid<Qid_. If that is the case (test 521 positive), it is determined at a test 523 whether Qid_=MaxQid. If that is the case (test 523 positive), it may be deduced thereby (event 533) that the first slices with QId≦Qid are missing in the current AU.

If test 523 is negative, it is followed by a test 525 at which it is checked whether Qid=minQid(Tid). If that is not the case (test 525 negative), it may be deduced thereby that the first quality layers of the current spatial layer in the current AU are missing (event 577). If on the other hand Qid=minQid(Tid) (test 525 positive), this means that the last quality layers are missing in the preceding AU (event 535).

If Qid<Qid_ is not satisfied (test 521 negative), it is checked at a test 529 whether Qid=Qid_=0. If that is the case, it means that the first slices of the current AU with QId=0 are missing (event 531). Otherwise (test 529 negative), it may be deduced thereby (event 537) that the first quality layers of the current AU are missing.

If test 517 is negative, that is to say if Did and Did_ are not equal and are non-zero, test 507 described earlier is returned to.

Each time a packet is received, the scalable layer selecting process 315 (FIG. 3) is activated.

As shown by FIG. 6, the scalable layer selecting process 315 first of all consists of determining, at a test 601, whether a NAL loss was identified at the preceding activation of the error detecting/locating process in accordance with the present invention.

If no loss was detected at that last activation of the error detecting/locating, all the layers are selected (step 603) to be decoded and the NAL decoding is carried out at step 317 (FIG. 3).

If on the other hand a loss was detected at the previous activation of the error detecting/locating, the scalable layer selecting process 315 then consists of initializing the variables Did, Qid, Tid and NumFrame to the value 0 (step 605).

Next at a test 607, the NAL that was identified as being lost on execution of the detecting/locating process is searched for. If the NAL having a given value of Did, Qid and Tid (which is denoted NAL(Did, Qid, Tid)) has been lost, the corresponding image is marked as lost (even if only one slice of that image has been lost) at a step 613. This step is followed by a test 615 which will be described below.

If the test 607 is negative, that is to say if the NAL considered (NAL(Did, Qid, Tid)) has not been lost, it is determined at a test 609 whether the reference image for that NAL has been lost. If that is not the case (test 609 negative), the test 615 described below is carried out. If on the other hand the reference image for that NAL had been lost (test 609 positive), the image concerned is marked as lost (step 611).

Test 615 consists of determining whether all the quality layers have been analyzed. For this, it is tested whether Qid≦MaxQid, where MaxQid designates the highest quality layer. If not all the quality layers have been analyzed yet, that is to say if Qid≦MaxQid (test 615 positive), Qid is increased, by incrementing for example the value Qid by one unit (step 616), then the process continues with a new MAL (return to test 607).

If all the values of Qid have been tested (test 615 negative), test 617 is proceeded to, at which it is tested whether all the spatial layers have been analyzed.

For this, it is tested whether Did≦MaxDid, where MaxDid designates the highest spatial layer. If not all the spatial layers have been analyzed (test 617 positive) Did is increased at a step 619, by incrementing for example by one unit the value of Did, and the minimum value authorized for Qid is attributed to Qid for the current value of Tid (denoted minQid (Tid)).

If on the other hand all the values of Did and of Qid for the current AU have been analyzed, it is checked at a test 621 whether all the images in the GOP for the current temporal layer (denoted Tid) have been analyzed.

For this, it is tested whether NumFrame≦NumFrame (Did, Tid). If the images of the GOP for Tid have not all been analyzed (test 621 positive), the process continues with the following image (step 623).

Furthermore, at step 623, the parameter DId is set to its minimum authorized value for the current value of Tid (this minimum value is denoted MinDid(Tid).

In addition, at step 623, the parameter QId is set to its minimum authorized value for the current value of Tid (this minimum value is denoted MinQid(Tid)).

When all the images of the current temporal layer have been analyzed (test 621 negative), it is examined at a test 625 whether all the temporal layers have been tested.

For this, it is tested whether Tid≦MaxTid, where MaxTid designates the highest temporal layer. If the images of the current temporal layer have not all been analyzed (test 625 positive), step 629 is proceeded to, at which the temporal layer above (Tid+1) is proceeded to and at which the parameters DId and QId are set to their minimum respective values for the current value of Tid (these minimum values are respectively denoted minDid(Tid) and minQid(Tid).

When all the images of the current temporal layer have been analyzed (test 625 negative), all the images lost, either directly (by loss of packets), or indirectly (by propagation of errors) are identified (step 631).

The process of selecting decoded layers may then commence. This process is illustrated in the flowchart of FIG. 7.

The selecting process commences at a step 701 by the initialization of Did, Qid and Tid to the value 0. Furthermore, the process commences with the first image having the current values of Did and Tid (i.e. NumFrame(Did, Tid)=0).

These variables will enable the entire structure of the GOP to be parsed. Furthermore, a variable Nloss(x,y,z) designating the number of losses is also initialized to the value zero at the step 701 (the variables x, y and z respectively taking all the possible values of Did, Qid and Tid).

Next, at a test 703, it is checked whether the image considered has been lost. If it has not been lost (test 703 negative), the image concerned is marked as displayed in the representation of the structure of the GOP (step 705). Step 705 is followed by a test 717 described later.

If on the other hand the image considered has been lost (test 703 positive), the variable Nloss(Did,Qid,Tid) is incremented by one unit (step 707).

Next, at a test 709, it is examined whether the value of the variable Nloss(Did,Qid,Tid) is strictly greater than a threshold which depends on the values of Did, Qid and Tid.

This threshold is denoted Th(Did,Qid,Tid). It represents the acceptable quantity of losses for a given triplet of values of Did, Qid and Tid. To be precise, each triplet represents a scalable layer. Given that some layers are more important than others, the acceptable level of losses cannot be the same for all the layers.

It the threshold is not exceeded (test 709 negative), test 717 is proceeded to. Otherwise (test 709 positive), all the images with DId≧Did, QId≧Qid and TId≧Tid are marked as not displayed at a step 711.

Next, at a step 713, the values of MaxQid, of MaxTid and of MaxDid are modified. Here the parsing of the entire structure of the GOP is avoided if it is already known that the quality of the following layers will not be acceptable.

Moreover, at step 713, the value of MaxQid for the values of DId greater than or equal to Did and for the values of TId greater than or equal to Tid is set, either to the value (Qid−1), or to the value zero if Qid=0. Still at step 713, the value of MaxTid for the values of DId greater than or equal to Did is set, either to the value (Tid−1), or to the value zero if Tid=0, and the value of MaxDid is set, either to the value (Did−1), or to the value zero if Did=0.

Step 713 is followed by a test 719 which will be described below.

At test 717, it is examined whether all the images with the current triplet (Did, Qid, Tid) have been processed. If the images corresponding to this triplet have not yet all been processed (test 717 negative), the following image is proceeded to (step 715) then test 703 described previously is returned to.

When all the images having the current triplet (Did, Qid, Tid) have been processed (test 717 positive), test 719 is proceeded to.

At test 719, it is checked whether Did has reached its maximum value. For this, it is tested whether Did is less than or equal to MaxDid.

If Did has not attained its maximum value (test 719 positive), Did is increased, by incrementing for example by one unit the value of Did (step 721), then test 703 is returned to.

If Did has reached its maximum value MaxDid (test 719 negative), a test 723, is carried out, consisting of checking whether Tid has reached its maximum value for the current value of Did. For this, it is tested whether Did is less than or equal to MaxDid(Did).

If Tid has not attained that maximum value (test 723 positive); Tid is increased, by incrementing for example by one unit the value of Tid (step 725), then test 703 is returned to. Moreover, at step 725, Did is reinitialized to its minimum value for the given value of Tid.

If Tid has reached its maximum value for the current value of Did i.e. Tid=MaxTid(Did) (test 723 negative), a test 727 is carried out, consisting of checking whether Qid has reached its maximum value for the current values of Did and Tid. For this, it is tested whether the value Qid is less than or equal to MaxQid(Did,Tid).

If Qid has not attained that maximum value (test 727 positive), the value of Qid is increased, by incrementing for example by one unit the value of Qid (step 729), then test 703 is returned to. Moreover, at step 729, Did is reinitialized to its minimum value for Tid=0 and Tid is reinitialized to the value zero.

If Qid has reached its maximum value for the current values of Did and Tid, i.e. Qid=MaxQid(Did,Tid) (test 727 negative), the scalable layer selecting process 315 is terminated.

It is to be noted that, in the flowcharts of FIGS. 4 to 7, the descriptions of tests consisting of testing, either whether a value has been reached and/or exceeded, or whether a value is strictly greater than a threshold, or whether all the images have been processed, etc. have been given by way of example that is in no way limiting, in accordance with the particular embodiments described. As a variant, these tests may equally well consist of testing the opposite condition, i.e. respectively whether the value considered has not been reached and/or has not been exceeded, or whether the value considered is less than or equal to the fixed threshold, or whether at least one image not yet processed remains, etc.

The processing operations illustrated in FIG. 7 are followed by step 317 of NAL decoding illustrated in FIG. 3.

Before decoding the current NAL, the SVC decoder 202 illustrated in FIG. 2 checks whether the image concerned has been marked as being lost, in the GOP structure stored in memory in the storage unit 6 of the client.

In accordance with the present invention, if the current image has been marked as lost, the SVC decoder 202 rejects the current NAL without decoding it. If that image has not been marked as lost, the NAL is decoded.

The result of executing the processing operations described above and illustrated in summarized form in FIG. 3 is the selection of a set of scalable layers, to decode by a decoder.

It is to be noted that the processing operations described in connection with FIGS. 4 and 7 may be implemented by so-called intelligent network nodes of MANE ("Media Aware Network Element") type, referred to in In this case, the result of step 315 (scalable layer selecting process), instead of being a set of scalable layers to decode, is a set of scalable layers to transmit.

Furthermore, in the case of such an implementation, step 317 of NAL decoding and display step 319 are replaced by a step consisting of transmitting over the network solely the scalable layer or layers which will (will have been) selected.

The invention claimed is:

1. A method of identifying data losses in a video sequence transmitted between a server and at least one client over a communication network, said video sequence comprising a plurality of video data network containers comprising video data, said video data being coded using hierarchical video coding employing a predetermined number of dependent hierarchical levels, said video data network containers being transmitted over said network via a series of data transport packets, the number of network containers transported by a data transport packet being random, said method of identifying data losses comprising:
   a step of detecting and locating errors, comprising detecting data losses and locating video data affected by said losses, said step of detecting and locating errors requiring no decoding of video data contained in said video data network containers and comprising:
   combining information coming from transport packets and information coming from video data network container headers; and
   deducing from the combined information the detection of said data losses and the location of the video data affected by said losses.

2. A method of identifying data losses according to claim 1, wherein said video sequence further comprises at least one network container of descriptive information, said descriptive information describing said video sequence, the method further comprising a step of receiving said descriptive information container and a step of creating a representation of a group of pictures of said video sequence.

3. A method of identifying data losses according to claim 2, wherein said step of receiving said descriptive information container comprises:
   an extraction operation comprising extracting information from said descriptive information container, said extraction operation being carried out once and only once, and said creating step using said information from said descriptive information container.

4. A method of identifying data losses according to claim 1, wherein said detection of data losses comprises using information relative to the rank of the data transport packets in said series of data transport packets.

5. A method of identifying data losses according to claim 4, implementing a transport protocol of RTP ("Real-time Transport Protocol") type, wherein said transport packets are RTP packets and said information concerning the rank of the transport packets in said series of transport packets are the RTP sequence numbers of said transport packets.

6. A method of identifying data losses according to claim 1, wherein the video sequence is coded in accordance with the SVC ("Scalable Video Coding") standard.

7. A client device in a communication network, comprising computing means, storage means and means for communicating with said network, said computing means cooperating with said storage means and said means for communicating with the network,
   wherein said computing means are configured to identify data losses in a video sequence received from a server device,
   said video sequence comprising a plurality of video data network containers containing video data, said video data being coded using hierarchical video coding employing a predetermined number of dependent hierarchical levels, said video data network containers being received by said client device from said server device, over said network, via a series of data transport packets, the number of network containers transported by a data transport packet being random, said computing means comprising:
   means for detecting and locating errors, configured to detect data losses and to locate video data affected by said losses, said means for detecting and locating errors operating without requiring video data contained in said video data containers to be decoded and comprising:
   means for combining information coming from transport packets and information coming from video data network container headers; and
   means for deducing from the combined information the detection of said data losses and the location of the video data affected by said losses.

8. A method of receiving a video sequence transmitted between a server and at least one client over a communication network,
   said video sequence comprising a plurality of video data network containers containing video data, said video data being coded using hierarchical video coding employing a predetermined number of hierarchical levels, said video data containers being transmitted over said network via a series of data transport packets,
   said receiving method comprising:
   a step of detecting and locating errors, comprising detecting data losses and locating video data affected by said losses, the step of detecting and locating errors requiring no decoding of video data contained in said video data network containers and comprising:
   combining information coming from transport packets and information coming from video data network container headers;

deducing from the combined information the detection of said data losses and the location of the video data affected by said losses; and a selecting step of selecting, according to the location of the video data affected by said losses, at least one hierarchical level of video data not to decode.

9. A receiving method according to claim 8, wherein said selecting step comprises:

a first test of determining whether a video data network container which corresponds to an image belonging to a given hierarchical level is lost; and a marking operation of marking the image as being lost if, at said first test, a container corresponding to said image is determined as being lost.

10. A receiving method according to claim 9, wherein said selecting step comprises:

a second test of determining whether a reference image for an image belonging to a given hierarchical level is lost; and a marking operation of marking said image as being lost if, at said second test, a reference image for said image is determined as being lost.

11. A receiving method according to claim 10, wherein, at said selecting step, a hierarchical level is selected according to the number of images belonging to said hierarchical level which have been marked as being lost.

12. A receiving method according to claim 11, wherein said number is compared to a threshold which depends on said hierarchical level.

13. A receiving method according to claim 11, wherein when, at said selecting step, a hierarchical level is selected, selection is also made of one or more hierarchical levels higher than said selected level.

14. A receiving method according to claim 8, wherein the steps of detecting and locating and of selecting are carried out by hierarchical level, starting with the lowest hierarchical level.

15. A client device according to claim 7, wherein said computing means further comprise means for selecting, according to the location of the video data affected by said losses, at least one hierarchical level of video data not to decode.

16. An information storage means which can be read by a computer or a microprocessor, storing instructions of a computer program for implementing a method of identifying data losses according to claim 1 and/or a receiving method according to claim 8.

* * * * *